United States Patent [19]

Ou

[11] Patent Number: 5,238,966
[45] Date of Patent: Aug. 24, 1993

[54] RIGID POLYVINYL CHLORIDE FOAM MATERIAL

[75] Inventor: Jer-Wen Ou, Nantou, Taiwan

[73] Assignee: Ah Shun Enterprise Co., Ltd., Taiwan

[21] Appl. No.: 956,387

[22] Filed: Oct. 5, 1992

[51] Int. Cl.$^5$ .............................................. C08J 9/14
[52] U.S. Cl. ........................................ 521/54; 521/81; 521/93; 521/96; 521/134; 521/136; 521/145; 521/149; 521/150
[58] Field of Search ............ 521/54, 81, 93, 96, 521/134, 136, 145, 149, 150

[56] References Cited

U.S. PATENT DOCUMENTS 4,886,837 12/1989 Kim et al. .............................. 521/145
4,956,396 9/1990 Kim et al. .............................. 521/145

*Primary Examiner*—Morton Foelak
*Attorney, Agent, or Firm*—Browdy and Neimark

[57] ABSTRACT

A rigid PVC foam material is made from a compound containing ingredients, such as polyvinyl chloride or vinyl chloroacetate copolymer, which is mixed with 5-50 parts by weight of ethylene vinyl acetate copolymer or ionized polyethylene resin or chloro sulfo polyethylene resin, 5-50 parts by weight of acrylobutadiene rubber or acrylic butadiene-styrene rubber or isoprene or natural rubber, 1-5 parts by weight of a stabilizer, 1-30 parts by weight of a chemical foaming agent, 0.2-5 parts by weight of a bridging agent, and 1-5 parts by weight of an extrusion-aiding agent. The mixture is extruded by a rolling machine at a temperature in a range of 100-150 degrees in Celsius and is subsequently transferred to a molding tool in which it is heated under a pressure and a temperature in a range of 120-170 degrees in Celsius for 10-60 minutes so as to bring about a foaming and bridging reaction.

3 Claims, No Drawings

RIGID POLYVINYL CHLORIDE FOAM MATERIAL

BACKGROUND OF THE INVENTION

The present invention relates to a polyvinyl chloride (PVC) foam material, and more particularly to a rigid PVC foam composite material, which is made without using an aiding agent such as the fluoro chloro carbon.

The polyvinyl chloride is in itself not a suitable substance for use as a foam material, in view of the facts that the molecular bridging of PVC is difficult to establish and that PVC has a relatively low viscosity even in a molten state. Therefore, the prior art method of making PVC foam material makes use of the fluoro chloro carbon as an agent to help increase the viscosity of PVC, as exemplified in an European Patent Application 0039117A1. Such prior art method includes an addition of 0.1–0.5 part by weight of alkyl methacrylate to 100 parts by weight of PVC, and an addition of the polymerized methyl methacrylate (PMMA) to the alkyl group with 1–10 carbon atoms. Such mixture is then fed into a double-screw extruder by which the mixture is granulated. The granules so made are mixed with an excess of trichloro fluoro methane and are stirred for 22 hours to ensure that the granules are impregnated with trichloro fluoro methane. The impregnated granules are subsequently mixed with one part by weight of citric acid powder per 100 parts by weight of PVC. This mixture so obtained is fed into a single-screw extruder in which the mixture is heated and pressurized so as to foam.

The chemical substance of trichloro methane used as a physical foaming agent in the prior art method described above is a potential source of environmental pollution and is therefore likely to be banned. In addition, the cost of a single-screw extruder and a double-screw extruder is rather high. Furthermore, the prior art method includes a process in which the granules are stirred in trichloro fluoro methane for 22 hours. As a result, the prior art method is not economically feasible.

SUMMARY OF THE INVENTION

It is, therefore, the primary objective of the present invention to provide a rigid PVC foam material, which is produced without using trichloro fluoro methane.

It is another objective of the present invention to provide a rigid PVC foam material, which can be made economically by means of existing production facilities for making EVA (ethylene vinyl acetate) foam material.

It is still another objective of the present invention to provide a rigid PVC foam material, which can be made easily and rapidly.

In keeping with the principles of the present invention, the foregoing objectives of the present invention are accomplished by a rigid PVC foam material, which is made by a method in which 100 parts by weight of polyvinyl chloride copolymer or vinyl chloroacetate copolymer are mixed with 5–50 parts by weight of a viscous substance such as acrylobutadiene rubber, or acrylic butadiene-styrene rubber, or polyisoprene, or natural rubber, so as to increase the viscosity of the copolymer. Since polyvinyl chloride (PVC) can not be mixed well with the rubber substance, 5–50 parts by weight of bridging medium such as EVA copolymer, or ionized polyethylene resin, or chloro sulfo polyethylene, etc., are added. In addition, 1–5 parts by weight of a stabilizer, 1–30 parts by weight of a chemical foaming agent, 0.2–5 parts by weight of a bridging agent, and 1–5 parts by weight of an extrusion-aiding agent are further added. The mixture so obtained is mixed and pressed by a rolling machine at a temperature in a range of 100 to 150 degrees in Celsius before the mixture is transferred to a molding tool in which the mixture is further heated under a pressure to a temperature in a range of 120 to 170 degrees in Celsius for a period of 10 to 60 minutes, so as to bring about a foaming and bridging reaction.

DETAILED DESCRIPTION OF THE PREFERRED EMBODIMENTS

A first preferred embodiment of the present invention includes the following steps of:

(a) preparing the ingredients, such as vinyl chloride vinyl acetate copolymer, EVA copolymer, acrylobutadiene rubber, a stabilizer, a foaming agent, a bridging agent, a heat-resisting agent, a hollow Q cell, an extrusion-aiding agent, and a filling agent, which are all mixed in accordance with the following proportions:

100 parts by weight of the vinyl chloride vinyl acetate copolymer is mixed with 5–50 parts by weight, preferably 5–30 parts by weight, of EVA copolymer; 5–50 parts by weight, preferably 5–30 parts by weight, of acrylobutadiene rubber; 1–5 parts by weight of a stabilizer; 1–30 parts by weight, preferably 3–20 parts by weight, of a chemical foaming agent (not a physical foaming agent such as trichloro fluoro methane which is used in the prior art); 0.2–5 parts by weight of a bridging agent, preferably 0.5–3 parts by weight of an organic peroxide; 5–40 parts by weight of a heat-resisting agent; 10–100 parts by weight of hollow Q cell or hollow phenol resin ball; 1–5 parts by weight of an extrusion-aiding agent, preferably rigid zinc fatty acid; and a filling agent, if necessary. The main ingredient of the mixture contains 50–95%, preferably 70–95%, of vinyl chloride, and 5–50%, preferably 5–30%, of vinyl acetate. The EVA copolymer contains 5–75%, preferably 5–40%, of vinyl acetate.

(b) The mixture obtained in the step (a) is extruded by a rolling machine at a temperature in a range of 100–150 degrees in Celsius.

(c) The compound so obtained is placed in a molding tool, which is closed under a pressure in a range of 50–160 kg/cm$^2$ and is subsequently heated at a temperature in a range of 120–17- degrees in Celsius. The compound is then foamed and bridged in the molding tool. This step is allowed to last for a period of 10–60 minutes.

(d) removing from the molding tool a highly-foamed rigid PVC composite material.

The steps (b), (c) and (d) described above are similar in procedures and facilities to the process of making EVA foam material. In other words, the conventional production facilities of EVA can be used to make the rigid PVC foam material of the present invention, without calling for an additional capital expenditure on the production equipments. In addition, the present invention eliminates the use of trichloro fluoro methane, which is an environmental pollutant.

A second preferred embodiment of the present invention is similar to the first preferred embodiment of the present invention, with the difference being that in the step (c) of the second preferred embodiment, the molding tool is heated for only about ten minutes before the foamed bodies are taken out of the molding tool and transferred to a larger molding tool or an oven, in which the foamed bodies are permitted to foam for the second time by subjecting them to a heat having a temperature in a range of 120-200 degrees in Celsius for a period lasting between 10 and 60 minutes. Such stepwise foaming process is able to yield 10 to 20 times more foamed bodies.

The main ingredient of the present invention is the vinyl chloride vinyl acetate copolymer, which can be replaced by PVC. The EVA copolymer may be replaced by the ionized polyethylene resin, or the chloropolyethylene, or the chloro sulfo polyethylene. The acrylobutadiene rubber may be replaced by the acrylic butadiene-styrene, or the methacrylic butadiene-styrene polymer, or the isoprene, or the natural rubber. The acrylic content in the acrylobutadiene rubber, or the acrylic butadiene-styrene rubber, or the methacrylic butadiene-styrene polymer is preferably in a range of 5-40%.

By increasing the content of the Q cell or the phenol resin ball in the rigid foam material of the present invention, the buoyancy of the rigid foam material can be increased up to 30-40 times. In addition, the foam material of the present invention is composed of the closed cell of high density, which accounts for the lightweight quality of the foam material. Furthermore, the foam material of the present invention is tough, resistant to impact, capable of absorbing shock, and an excellent insulation material. As a result, the foam material of the present invention can be used in a variety of industrial applications.

What is claimed is:

1. A rigid polyvinyl chloride foam material made from a compound containing ingredients, which are mixed and extruded by a rolling machine at a temperature in a range of 100-150 degrees in Celsius, and which are subsequently heated in a molding tool under a pressure and a temperature in a range of 120-170 degrees in Celsius for 10-60 minutes, so as to bring about a foaming and bridging reaction; wherein said compound is characterized in that it contains 100 parts by weight of polyvinyl chloride or vinyl chloroacetate copolymer, which is mixed with 5-50 parts by weight of ethylene vinyl acetate copolymer or ionized polyethylene resin or chloro sulfo polyethylene resin, 5-50 parts by weight of acrylobutadiene rubber or acrylic butadiene-styrene rubber or polyisoprene or natural rubber, 1-5 parts by weight of a stabilizer, 1-30 parts by weight of a chemical foaming agent, 0.2-5 parts by weight of a bridging agent, and 1-5 parts by weight of an extrusion-aiding agent; wherein said vinyl chloroacetate copolymer contains 50-95% by weight of vinyl chloride and 5-50% by weight of vinyl acetate; and wherein said ethylene vinyl acetate copolymer contains 5-75% by weight of vinyl acetate.

2. The rigid polyvinyl chloride foam material of claim 1 containing 5-40 parts by weight of a heat-resisting agent.

3. The rigid polyvinyl chloride foam material of claim 1 containing 10-100 parts by weight of a Q cell or a phenol resin ball.

* * * * *